US010924398B2

(12) United States Patent
Vutharkar et al.

(10) Patent No.: US 10,924,398 B2
(45) Date of Patent: Feb. 16, 2021

(54) TIME-SERIES DATA MONITORING WITH SHARDED SERVER

(71) Applicant: eBay Inc., San Jose, CA (US)

(72) Inventors: Viswa Vutharkar, Roseville, CA (US); Jun Li, Mountain View, CA (US); Siddharth Mark Joseph, San Jose, CA (US)

(73) Assignee: eBay Inc., San Jose, CA (US)

( * ) Notice: Subject to any disclaimer, the term of this patent is extended or adjusted under 35 U.S.C. 154(b) by 119 days.

(21) Appl. No.: 16/141,611

(22) Filed: Sep. 25, 2018

(65) Prior Publication Data
US 2020/0099614 A1 Mar. 26, 2020

(51) Int. Cl.
H04L 12/721 (2013.01)
G06F 7/14 (2006.01)
G06F 16/245 (2019.01)

(52) U.S. Cl.
CPC ............ H04L 45/70 (2013.01); G06F 7/14 (2013.01); G06F 16/245 (2019.01)

(58) Field of Classification Search
None
See application file for complete search history.

(56) References Cited

U.S. PATENT DOCUMENTS

2009/0319684 A1* 12/2009 Kakivaya .......... H04L 29/12066
709/238
2013/0290249 A1 10/2013 Merriman et al.
2014/0108421 A1 4/2014 Isaacson et al.
2016/0142475 A1* 5/2016 Kathuria ............. H04L 67/1008
709/203
2016/0359872 A1* 12/2016 Yadav .................... H04L 63/02

OTHER PUBLICATIONS

Cortexproject, "GitHub—cortexproject / cortex", Retrieved from the Internet URL <https://github.com/weaveworks/cortex>, Aug. 10, 2020, 5 pages.
Timescale, "GitHub—timescale / timescaledb", Retrieved from the Internet URL <https://github.com/timescale/timescaledb>, Aug. 10, 2020, 5 pages.

* cited by examiner

Primary Examiner — Ayaz R Sheikh
Assistant Examiner — Sori A Aga
(74) Attorney, Agent, or Firm — SBMC

(57) ABSTRACT

Described are aspects of a sharded monitoring system that collects metrics data from a plurality of targets within a monitored system. In various embodiments, the monitoring system includes multiple monitoring-server instances each collecting metrics data from a respective subset of the targets, as well as a federation server that collects aggregated metrics data from the other monitoring-server instances. Mappings between monitoring targets and monitoring-server instances collecting their metrics data may be stored in a temporal routing map, e.g., on the federation server, which may build the map, in accordance with some embodiments, based on time-series routing metrics received from the other monitoring-serve instances. The routing map may be used to direct queries for metrics data from a client to the appropriate monitoring-server instance. Further aspects and embodiments are disclosed.

20 Claims, 9 Drawing Sheets

US 10,924,398 B2

TIME-SERIES DATA MONITORING WITH SHARDED SERVER

TECHNICAL FIELD

The present disclosure generally relates to monitoring systems and methods for collecting data from distributed computing systems. In particular, the present disclosure addresses monitoring systems that are themselves "sharded," i.e., distributed across multiple server computers, and related methods for load balancing and query routing within such systems.

BACKGROUND

Providers of large-scale online service platforms (such as, e.g., e-commerce, social-network, or cloud-services platforms) typically operate large distributed systems whose architecture components may be spread across multiple data centers at disparate locations. To ensure the proper operation of these platforms and facilitate prompt remediation of any problems, it is important to continuously monitor the health and functionality of all of the components. Monitoring systems perform this task by collecting time-series metrics data from the components of the monitored system, applying rules to the collected data to detect specified events and trigger alerting or monitoring functions, and/or aggregating, filtering, or otherwise processing the data for further analysis. Visualization tools allow system administrators or other users to query the monitoring system and to visualize and further analyze recorded (raw or processed/aggregated) metrics data for performance-monitoring and troubleshooting purposes.

For very large monitored system, the monitoring system itself can be distributed over multiple server machines running multiple instances of a monitoring program, such that the data load coming in from the monitored system is shared between the monitoring-server instances and machines hosting them. Beneficially, a monitoring system that is sharded in this manner can be scaled to growing data loads by adding new monitoring-server instances as needed. However, the sharded monitoring system also comes with additional challenges, including the need for a suitable mechanism for routing queries from a visualization tool or other client to the appropriate ones of the monitoring-server instances (which may vary as the number of monitoring-server instances changes).

BRIEF DESCRIPTION OF THE DRAWINGS

The appended drawings illustrate, by way of example and not of limitation, various embodiments of systems, methods, devices, and computer program products implementing the inventive subject matter.

DETAILED DESCRIPTION

Figure 1:
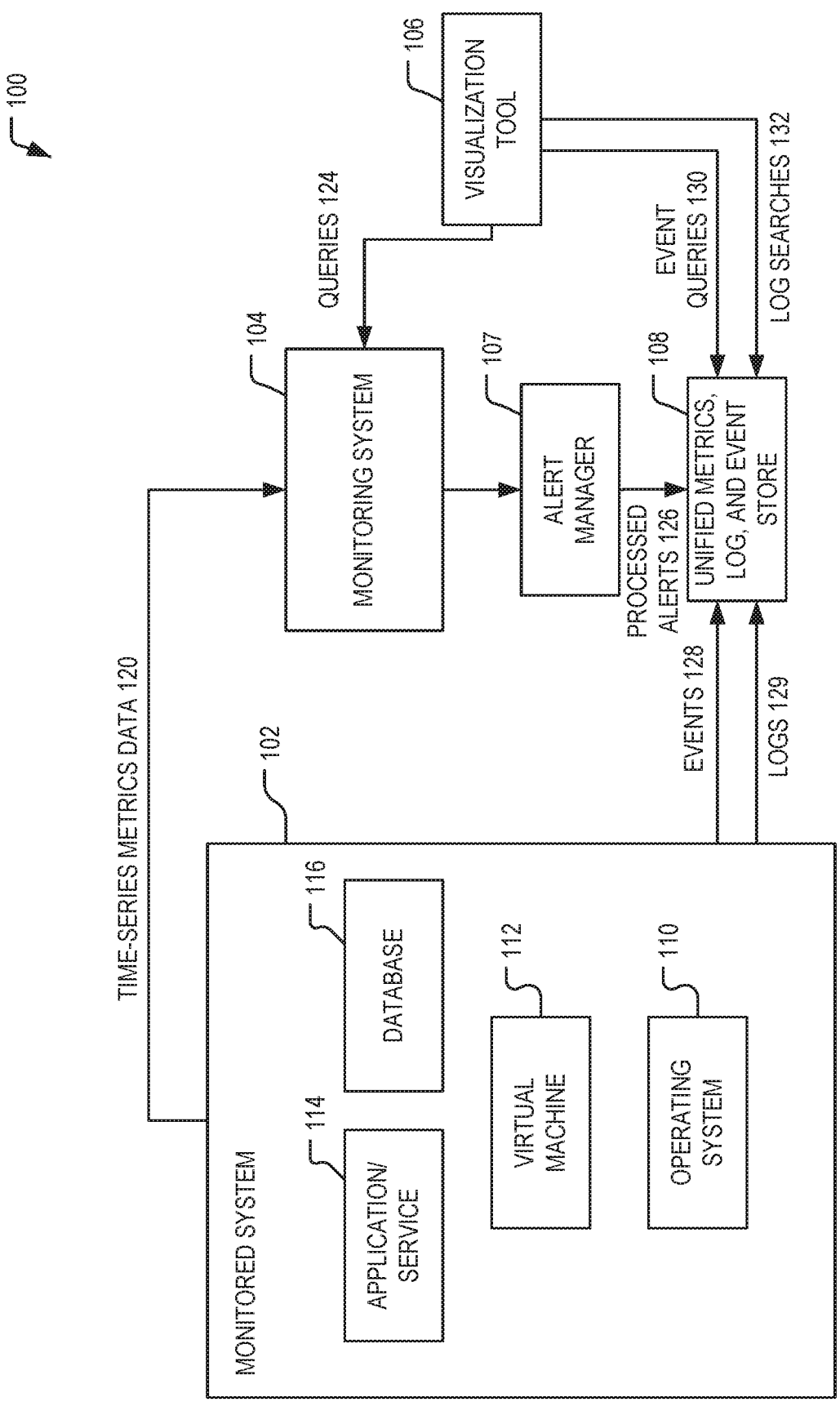
FIG. 1 is a block diagram illustrating actors within a monitoring ecosystem according to example embodiments.

In the following description, reference will be made to specific example embodiments for carrying out the inventive subject matter. Examples of these specific embodiments are illustrated in the accompanying drawings. It will be understood that these examples are not intended to limit the scope of the claims to the illustrated embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details.

The present disclosure relates to various aspects of a monitoring ecosystem including a sharded monitoring system that collects metrics data from a plurality of hardware or software components within a monitored system. The monitored components, or partitions thereof generated for load-spreading purposes, are herein also referred to as monitoring "targets." In various embodiments, the monitoring system includes multiple monitoring-server instances each collecting metrics data from a respective subset of the monitoring targets as well as a "federation monitoring-server instance" (or simply "federation server") that collects aggregated metrics data from the other monitoring-server instances. The monitoring system can be continuously sharded in the sense that, as the monitored system grows in the number of targets and/or the volume of metrics data it produces, the capacity of the monitoring system can be seamlessly adjusted by adding monitoring-server instances and/or making reassignments between targets and monitoring-server instances. This seamless adjusting may have various technical advantages, including improvement of scalability—data shards can be spread elastically across many computing nodes. Furthermore, in some embodiments, high data availability is achieved by redundantly collecting metrics from a given subset of targets by two or more monitoring-server instances, which may be hosted in different data centers. By redundantly collecting metrics, a technical advantage of improved failover is provided. Further, collecting metrics from a subset of targets (as opposed to all targets) allows less network bandwidth to be used by the individual monitoring-server instances, which improves efficiency and performance of retrieving the correct data from specific targets.

In one aspect of the disclosed subject matter, the mappings between monitoring targets and monitoring-server instances collecting their metrics data are stored in a temporal routing map, e.g., on the federation server. The federation server may build the map based on messages from the other monitoring-server instances that report, e.g., in the form of time-series routing metrics, which target(s) each monitoring-serve instance monitors. Using the routing map, queries for metrics data from a client, such as a visualization tool, can be directed to the appropriate monitoring-server instance that has the requested metrics data. In a further aspect, as between two monitoring-server instances redundantly storing metrics data relevant to a query, the query is directed to the monitoring-server instance that has the higher-quality (e.g., more complete) data, e.g., as determined by a consensus projection from both monitoring-server instances based on health checks performed on each. Accordingly, this aspect of the disclosed subject matter may confer a technical advantage of improved data accuracy and improved monitoring for purposes of health and performance of server machines.

With reference now to FIG. 1, a monitoring ecosystem 100 in accordance with various embodiments may include a monitored system 102, a monitoring system 104, and, optionally, additional monitoring tools such as, e.g., one or more visualization tools 106, alert managers 107, and/or unified metrics, log, and event stores 108 (herein also "unified MLE stores"). Each of the depicted actors 102, 104, 106, 107, 108 within the ecosystem 100 represents a functional block implemented by a suitable combination of computing hardware (e.g., one or more general-purpose computers including one or more processors and memory, as illustrated in more detail in FIG. 9) and/or software. Each individual actor 102, 104, 106, 107, 108, although shown as a single block, may include, or execute on, a single computer or a cluster of computers. Furthermore, two or more of the actors may be implemented on the same computer or computer cluster, or otherwise share hardware resources. The computers or clusters implementing the various actors 102, 104, 106, 107, 108, as well as the computers within each cluster, are connected to each other via one or more communications networks (not shown), such as the Internet or a local area network (LAN) or wide area network (WAN), implemented with suitable wired or wireless network technology.

The monitored system 102 is, generally, a computing system—used internally by an organization or providing a platform of service offerings to customers—whose operational health is subject to monitoring. In various embodiments, the monitored system 102 is distributed over multiple computers each running an operating system (OS) 110 and, on top of the operating system 110, one or more software programs. In some embodiments, the monitored system 102 further implements one or more virtual machines (VMs) 112. (A virtual machine 112 is a software-based emulation of a computer system that, like a physical computer, can run an operating system and applications. Multiple virtual machines can run simultaneously on the same physical computer.) On each computer or within each virtual machine 112, the monitored system 102 may execute one or more applications or services 114 and/or maintain one or more databases (DBs) 116 (or portions thereof). (A database 116 is an organized collection of electronic data stored on one or more computer-readable media. The data collection itself is typically accompanied by a database management system (DBMS) that allows defining, creating, updating, and querying the data collection, and/or serves other database administration functions. Examples of databases and DBMSs include MONGODB (a cross-platform document-oriented database provided by MongoDB, Inc., New York City, N.Y.), ORACLE (provided by Oracle Corporation, Redwood City, Calif.), and Monstor DB (a document-oriented database provided by eBay Inc., San Jose, Calif.), to name just a few.)

In the context of the present disclosure, physical computers and their operating systems 110, virtual machines 112, applications/services 114, and databases 116 are all examples of categories of monitoring targets (from the perspective of the monitoring system 104).

The monitoring system 104 is a computing system, generally implemented with software executing in one or more instances on one or more server computers or virtual machines, configured to monitor one or more monitoring targets (hardware and/or software components or partitions thereof) within the monitored system 102 by collecting time-series metrics data 120 (i.e., streams of timestamped values belonging to the same metric) from the targets and providing functionality for aggregating the collected metrics into higher-level metrics (optionally at multiple levels of aggregation), storing at least some of the collected and/or aggregated metrics for subsequent querying, processing the (collected or aggregated) metrics to trigger rule-based alerts, and/or visualizing the (collected or aggregated) metrics. The collected metrics may include, without limitation, usage (e.g., CPU usage and available disk space), throughput (e.g., number of database accesses per second, number of web requests per second and volume of data uploaded/downloaded per second), latency (e.g., delay in seconds between request and response), and error metrics (e.g., number of errors encountered due to high network latency), etc. As will be appreciated, the types of metrics collected generally depend on the category of monitoring target. Metrics can be collected passively via push operations by the targets, or actively by pulling from (i.e., scraping) the targets. The monitoring system 104 can be implemented, for example and without limitation, with a software platform such as "Prometheus," which provides a multi-dimensional data model for collecting and storing metrics, a flexible query language, an efficient time-series database, and threshold-based alerting mechanisms. In a multi-dimensional data model, metrics are annotated with labels specifying metadata such as, e.g., an identifier or characteristic of the target, allowing the data to be sliced and diced in different ways.

The visualization tool 106 represents a software application or platform for analyzing and visualizing time-series metrics data, e.g., with user-configurable, interactive dashboards. Visualization tools 106 can operate in conjunction with, and serve as the primary user interface for, the monitoring systems 104, from which they can retrieve stored metrics data via suitable queries 124. (In that sense, the visualization tool 106 can be regarded a client, from the perspective of the monitoring system 104.) A visualization tool may be used to query monitoring systems 104 and visualize the query results. In some embodiments, the visualization tool 106 includes analysis and visualization functionality customized for the monitored system 102 and/or the particular metrics collected.

The alert manager 107 further processes alerts fired from the monitoring system 104 (e.g., to deduplicate alerts), sends processed alerts 126 to the unified MEL store 108 for storage, and/or generates and dispatches (e.g., via a http post mechanism) alert notifications (not shown) to users.

The unified MLE store 108 is a software platform that records events (or alerts, which are a subset of events that are deemed critical) and associated logs, that is, log statements produced by the monitored system 102. Complementing the monitoring system 104, which may provide near-term metrics retention by storing metrics data for a limited period (e.g., for seven days), the unified MLE store 108 can serve as a backend store for long-term data retention of metrics data. Alternatively or in addition to receiving event data from the monitoring system 104 (e.g., directly or via the alert manager 107), the unified MLE store 108 may also obtain events 128 and logs 129 directly from the monitored system 102, e.g., using event and file monitoring daemons to scrape the events and logs generated in the monitored system 102. For time-series metrics generated in the monitored system 102, the unified MLE store 108 can obtain metrics directly from the monitored system 102, using the metrics monitoring daemons to scrape the metrics. Such dual-path metrics collection (i.e., through the monitoring system 104 and through the unified MLE store 108) provides redundancy as well as some flexibility to accommodate varying needs in an evolving ecosystem architecture. The unified MLE store 108 may include a user-interface component that allows a user to view and analyze the stored event and log data. Alternatively or additionally, the unified MLE store 108 may respond to event queries 130 and/or log searches 132 from the visualization tool 106.

In accordance with various embodiments, the monitored system 102 as well as the monitoring system 104 are distributed systems with databases and applications (e.g., services provided by the monitored system 102, or the monitoring program executing in the monitoring system 104) hosted across multiple machines and/or within multiple data centers. To implement such a distributed architecture, a suitable deployment platform may be utilized. In general, a deployment platform is a manager for the automated deployment of applications across one or more hosts (i.e., physical machines). The deployment platform may utilize virtualization technology, such as application containers (light-weight virtual machines for running applications). In one possible embodiment, Kubernetes may employ application containers, with a specialized container called a "kubelet" that handles health monitoring and command control on each host. Importantly, the deployment manager may be any platform that deploys applications, or application containers, across one or more host machines. Examples of deployment platforms include services, runtimes, or platforms that run in AMAZON WEB SERVICES (AWS), MICROSOFT AZURE, GOOGLE CLOUD, or any cloud services run in data centers.

Figure 2:
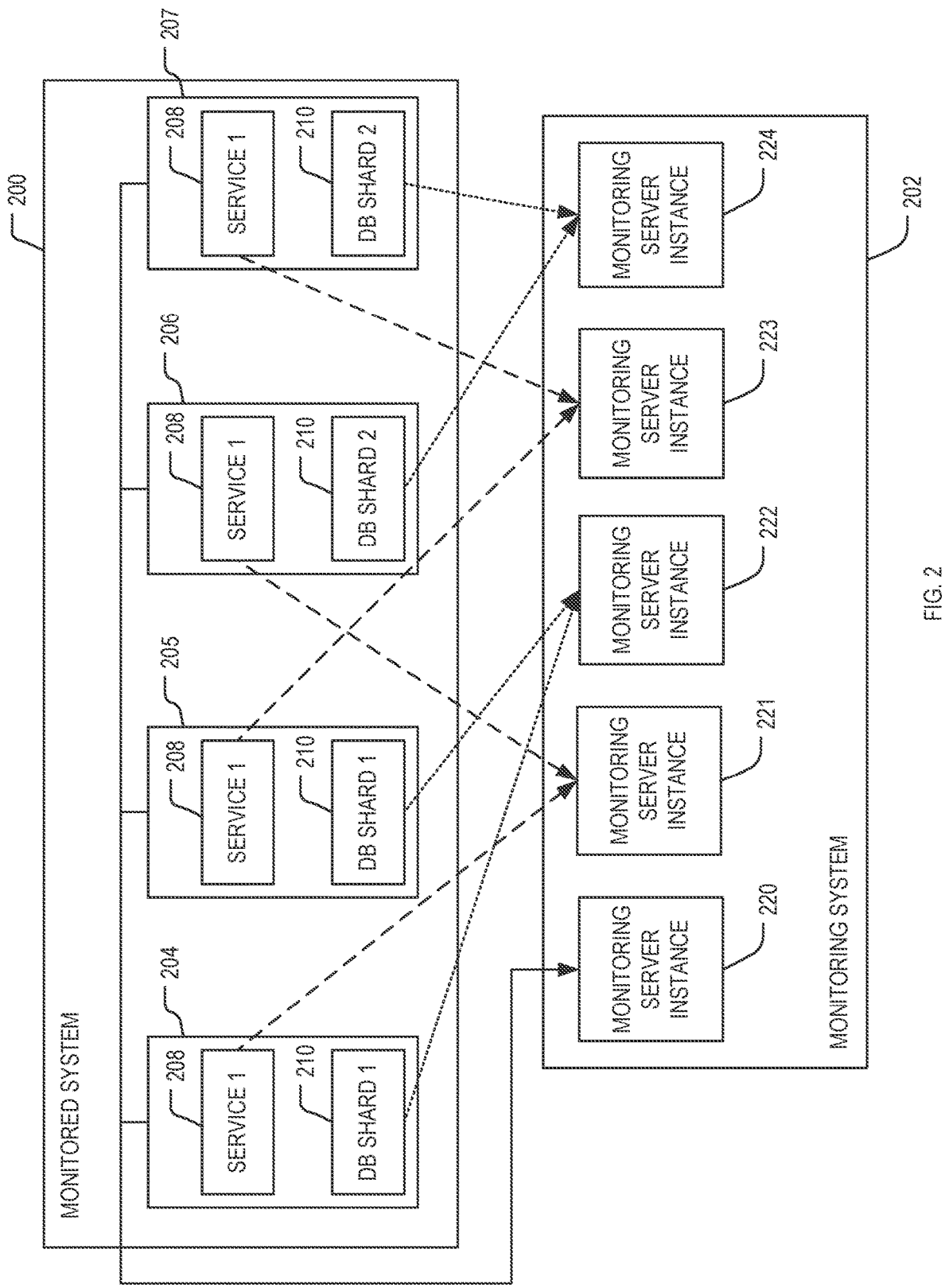
FIG. 2 is a block diagram illustrating distributed monitored and monitoring systems within a monitoring ecosystem according to example embodiments.

FIG. 2 conceptually illustrates a simplified example architecture of distributed monitored and monitoring systems 200, 202 according to various embodiments. The monitored system 200 includes, in this depiction, four hosts 204, 205, 206, 207. (Of course, a distributed system may generally include any number of hosts equal to or greater than two.) An application 208 (labeled "Service 1") and a database 210 are each deployed across all four DB hosts 204, 205, 206, 207. In accordance with some embodiments, the database 210 may be horizontally partitioned into multiple shards that are stored on different groups of hosts. In the depicted example, two shards, labeled "DB shard 1" and "DB shard 2," are stored on hosts 204, 205 and 206, 207, respectively. Sharding a database generally serves to spread database-access loads by holding each shard on a respective separate database-server instances. For purposes of redundancy, each shard may contain multiple replica of its data, collectively called a "replica set." A single replica set (corresponding to a single shard) may, for instance, include a master, a hidden (admin) replica, one or more secondary replicas, and an arbiter. As shown, a replica set, or shard, may be distributed across multiple hosts. In FIG. 2, for example, DB shard 1 is distributed across hosts 204, 205, and DB shard 2 is distributed across hosts 206, 207. Although not depicted for simplicity, the instances of the application 208 and the database shards DB shard 1 and DB shard 2 may also run within virtual machines or containers configured within or across the hosts 204, 205, 206, 207.

To monitor the performance and health of the monitored system 200, the monitoring system 202 may collect metrics from the database shards DB shard 1 and DB shard 2 and the application instances of Service 1 (208), as well as system/OS-level metrics (e.g., related to CPU, memory, and network/disk-IO) from each of the hosts 204, 205, 206, 207 (and/or virtual runtime metrics from the virtual machines/containers, for example, the garbage collection time associated with the Java virtual machine runtime). System/OS-level metrics on each host may be exposed by, and may be obtained by scraping, the respective kubelet. In cases where the overall volume of metrics data is too large to be handled by a single monitoring-server instance, the monitoring system 202 is sharded into multiple monitoring-server instances, which may divide the load by category of monitoring targets, with further subdivisions if needed. For instance, in the depicted example, monitoring system 202 includes five monitoring-server instances 220, 221, 222, 223, 224; monitoring-server instance 220 collects system/OS-level metrics (indicated by solid lines) from all hosts 204, 205, 206, 207; monitoring-server instance 221 collects application metrics (indicated by dashed lines) from application instances 208 executing on hosts 204, 206 (constituting two targets); monitoring-server instance 222 collects database metrics (indicated by dotted lines) from DB shard 1 across hosts 204, 205; monitoring-server instance 223 collects application metrics (indicated by dashed lines) from application instances 208 executing on hosts 205, 207; and monitoring-server instance 224 collects database metrics (indicated by dotted lines) from DB shard 2. Other mappings between the monitoring targets and monitoring-server instances (which need not be five in number, of course) are possible.

In general, any given target, such as a certain database shard or the hardware and operating system on a certain host, is monitored by only one monitoring-server instance, but an individual monitoring-server instance may, if capacity allows, obtain metrics from multiple monitoring targets. In some embodiments, each category of targets is monitored by a corresponding subset of monitoring-server instances. Beneficially, the sharded monitoring system 202 can be scaled to meet a varying data load from the monitored system 200 by adjusting the number of monitoring-server instances deployed (e.g., deploying new monitoring-server instances to accommodate an increasing data load).

The assignment of targets (within a certain category) to monitoring-server instances is achieved, in accordance with various embodiments, by a hash-and-modulo function operating on certain labels of the targets. For example, for OS monitoring, the hash function may be applied to the hostname. For applications executing within containers or groups of containers called "pods," the hash function may be applied to the name of the container or pod. For databases, the hash function may be applied to a combination of the keyspace, which identifies a logical database consisting of a collection of shards, and an identifier of the database shard. With these hashing functions, hashing alone would result in the OS on each host, each application container/pod, and each database shard being assigned to a separate monitoring-server instance. The modulo function achieves a grouping of targets within a category. For example, modulo 2 would split the targets into two (roughly equal-sized) groups: one group with even hash-modulo and one with odd hash-modulo.

Figure 3:
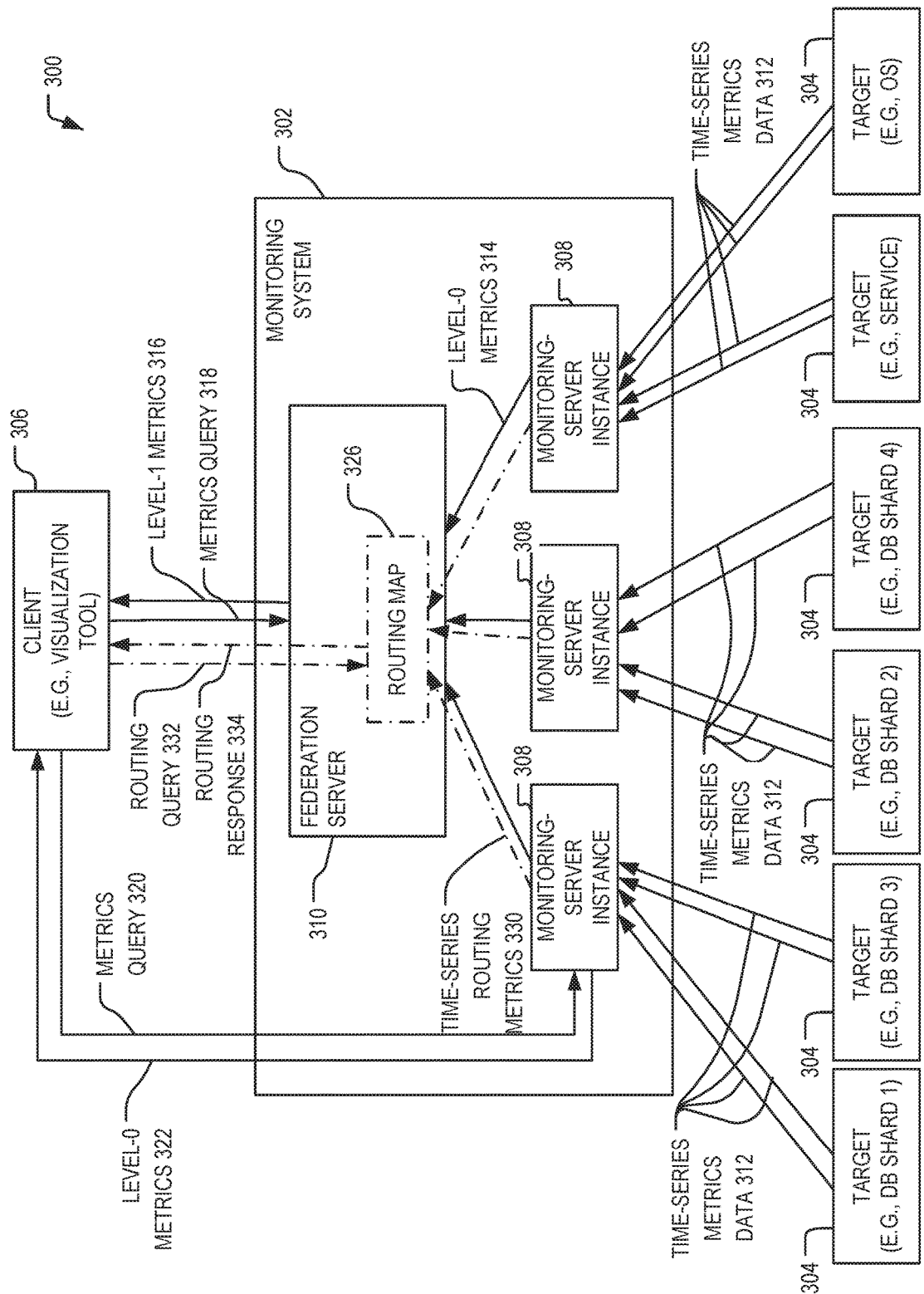
FIG. 3 is a block diagram illustrating metrics data flows and query routing within a monitoring ecosystem according to example embodiments.

Turning now to FIG. 3, an example monitoring ecosystem 300 is shown to illustrate data flows, in accordance with various embodiments, between the monitoring system 302 and a plurality of monitoring targets 304 as well as between the monitoring system 302 and a client 306. The monitoring system 302 includes, in this example, a plurality of (e.g., as depicted, three) monitoring-server instances 308 that scrape (or otherwise collect metrics from) the targets 304 and a federation server 310 that, in turn, scrapes (or otherwise collects metrics from) the monitoring-server instances 308. From the perspective of the federation server 310, the (other) monitoring-server instances 308 constitute the monitoring targets. Apart from this relationship, the federation server 310 is just another monitoring-server instance 308, implemented as an instance of a monitoring program on a host machine.

Each of the targets 304 is a component or component-shard of a monitored system (such as, e.g., monitored system 102). For example, as indicated parenthetically in the figure for illustration purposes only, the six depicted targets 304 may correspond to database shards 1-4, a service, and an operating system. In general, of course, the targets 304 may belong to any combination of categories and include any number of targets within each category; for purposes of FIG. 3, the specific nature of any target as well as the distribution of targets across hosts is not important. It suffices to observe that each of the monitoring-server instances 308 collects time-series metrics data 312 from a subset of the targets 304. For instance, as depicted, each of the three monitoring-server instances 308 scrapes two of the six targets 304. Other assignments of targets 304 to monitoring-server instances 308 are, of course, possible. In particular, it is not necessary that each monitoring-server instance 308 scrapes the same number of targets 304. Rather, assuming monitoring-server instances 308 of equal or at least comparable capacity, assignments will, in practice, usually be made so as to evenly balance the data load between monitoring-server instances. Such a balanced load distribution may be achieved by determining the number of monitoring-server instances 308 allocated to each target category based on the overall expected data volume within that category, and then distributing targets within each category as evenly as possible between the respective monitoring-server instances.

At the monitoring system 302, the individual monitoring-server instances 308 aggregate at least some of the time-series metrics data 312 received from their respective targets 304 based on aggregation and recording rules to generate "level-0" aggregated metrics 314 (herein also "lower-level aggregated metrics"), which are themselves time-series metrics. A monitoring-server instance 308 scraping multiple shards of a target (e.g., multiple database shards) may, for instance, aggregate metrics across these shards. For example, from database metrics indicating whether the master replica within a given database shard is available or down, the monitoring-server instance 308 may create a level-0 metric specifying the "number of shards with master down." Since metrics data from the shards of a given database or keyspace may be distributed between multiple monitoring-server instances 308, this level-0 metric does, however, not capture the total number of shards with master down across the entire database or keyspace. To facilitate aggregation across monitoring-server instances 308, the federation server 310 collects the level-0 aggregated metrics 314 (indicated in FIG. 3 by solid arrows between the monitoring-server instances 308 and the federation server 310) and further aggregates them into "level-1" aggregated metrics 316 (herein also "higher-level aggregated metrics"). Note that a level-1 metric generally need not aggregate level-0 metrics across all monitoring-server instances. Rather, aggregation may be performed across a subset of monitoring-server instances 308. For example, to obtain the total number of shards with master down across a keyspace, the corresponding level-0 metrics are summed over the set of monitoring-server instances 308 collectively monitoring all shards within the keyspace.

A client 306, such as a visualization tool 106, may query the monitoring system 302 to obtain the level-0 and/or level-1 aggregated metrics 314, 316. (If needed to drill down deeper into the (non-aggregated) metrics data associated with, e.g., a given event, the visualization tool 106 (or other client) may further access that data, to the extent recorded, in the unified MLE store 108 or other pre-aggregation time-series metrics data store.) To obtain level-1 metrics, the client may simply issue a query 318 to the federation server 310, which then returns the requested level-1 metrics 316 in a response message. To request level-0 metrics, the client 306 first obtains routing information as to which one of the monitoring-server instances 308 holds the level-0 metrics corresponding to the particular target 304 (e.g., a specific database shard) the client is interested in, and then issues the query 320 to that monitoring-server instance 308, receiving the level-0 metrics 322 in reply.

Conventionally, the determination of the monitoring-server instance 308 that holds metrics data for a given target 304 involves the application of the hash-and-modulo function over the labels (or called dimensions in time-series databases) associated with the metrics, followed by a look-up. That method, however, is contingent upon knowledge of the exact hash-and-modulo function and labels applicable for the given target, and such knowledge may not be readily available to the client 306. The problem is exacerbated in situations where the monitoring targets 304 and/or the number of monitoring-server instances 308 change, which may entail adjustments to the modulo (e.g., to distribute targets between a larger number of monitoring-server instances), or to the labels from which the hash value is computed (e.g., due to new dynamically discovered labels) and/or the hash function itself. In these circumstances, the client 306 may resort to broadcasting its request and await which ones of the monitoring-server instances 308 responds with the requested data. To circumvent these difficulties and associated inefficiencies, various embodiments store the mappings between targets 304 and monitoring-server instances 308 as time-series data in a temporal routing map 326. The client 306 can then query the routing map 326 for the monitoring-server instance 308 that contains metrics data for a specified target 304 collected at a specified time.

In some embodiments, the temporal routing map 326 is stored on the federation server 310. The federation server 310 may assemble the map 326 based on messages from the monitoring-server instances 308 that specify which target(s) 304 each monitoring-server instance 308 scrapes. More specifically, the messages may be sent at regular intervals (e.g., at the rate at which the monitoring-server instances 308 acquire time-series metrics data from the targets 304), and may each include (e.g., in the payload and/or a message header) a timestamp, an identifier of the monitoring-server instance 308 sending the message, and the identifier(s) of the one or more target(s) 304 from which this monitoring-server instance 308 collects metrics data.

In one embodiment, the messages conveying the routing information take the form of time-series metrics 330 (indicated in FIG. 3 by dash-dotted arrows between the monitoring-server instances 308 and the routing map 326). For purposes of illustration, consider first the structure of an ordinary time-series metric, which generally includes the name of the metric (e.g., "tps"), a timestamp (e.g., "@123456789123"), and a value (e.g., "1057"). To distinguish between the same type of metric collected from different targets, the name of the metric is often annotated, e.g., in curly braces, with a label or set of labels identifying the target (e.g., "{host1}"). The monitoring-server instances 308 can exploit this general structure to convey routing information by each generating for each monitored target a metric, for example, called "routing_map," with a label that identifies the target (e.g., a label named "routing_target_id." described as routing_target_id="service-pod-1-2-7"), specifying the respective monitoring-server instance in a second label (e.g., a label named "monitoring_server_id," described as monitoring_server_id="monitoring-server-id-1"). A metric value need not be used to determine the relationship between the monitoring-server instance and the monitoring target. However, to follow the standard metric definition and metric scraping protocol, the routing metric is assigned some value, which may, for example, be set to the integer 1 (e.g., to denote that the monitoring target is currently being scraped successfully), or to the integer 0 (to denote that the monitoring target is currently being scraped without success. Thus, monitoring-server instance 1 scraping targets with IDs DB1, DB2, and DB3 at a time timestamped "@4444" may convey this information by sending three metrics: routing_map{routing_target_id="DB1", monitoring_server_id="monitoring-server1" } @4444=1, routing_map{routing_target_id="DB2", monitoring_server_id="monitoring-server1"} @4444=1, and routing_map{routing_target_id="DB3", monitoring_server_id="monitoring-server1"}@4444=1.
When, at a later time, target DB3 is re-assigned to monitoring-server instance 2 (without any other changes taking place), monitoring-server instance 1 will continue sending the routing metrics for DB1 and DB2, but the routing metric for DB3 will now (say, at a time timestamped "@5555" following the change) be sent by monitoring-server instance 2 as: routing_map{(routing_target_id="DB3", monitoring_target_id="monitoring-server2"}@5555=1"
The table below illustrates example time-series entries in the routing map for the above example; the general schema to which the entries conform is shown in italics in the header row.

| metric{labels} | timestamp | value |
|---|---|---|
| routing_map{routing_target_id="DB1", monitoring_server_id="server1"} | @4444 | 1 |
| routing_map{routing_target_id="DB2", monitoring_server_id="server1"} | @4444 | 1 |
| routing_map{routing_target_id="DB3", monitoring_server_id="server1"} | @4444 | 1 |
| routing_map{routing_target_id="DB1", monitoring_server_id="server1"} | @5555 | 1 |
| routing_map{routing_target_id="DB2", monitoring_server_id="server1"} | @5555 | 1 |
| routing_map{routing_target_id="DB3", monitoring_server_id="server2"} | @5555 | 1 |

Note that the above table shows identifier of the monitored target encoded as a single label. In practice, the target identifier can be encoded as multiple labels in a routing map as well. For example, if the running instances of all DB replicas in the same shard in a keyspace are scraped by the same monitoring-server instance, the routing map may encode the identifier of the monitoring target as two labels: shard_id="shard-123" and keyspace_id="keyspace-866" (instead of just a label: routing_target_id="DB 1" as shown in the above table). The number and types of labels used for the target identifier are generally consistent with the partitioning scheme used to assign monitoring-server instances to targets. In the above example, this partitioning scheme takes two parameters, shard id and keyspace id, in the hash-and-modulo function. The corresponding routing map entry in this example is: routing_map{shard_id="shard-123", keyspace_id="keyspace-866", monitoring_server_id="server1"}=1. For purposes of this application, it is to be understood that the target identifier may generally include one or more labels.

Beneficially, by encoding the routing information as time-series metrics 330, the monitoring-server instances 308 enable the federation server 310 to obtain time-dependent partial routing maps in the same manner as it obtains the level-1 aggregated metrics 316. The federation server 310 can merge these partial maps to form the global temporal routing map 326. Upon receipt of a routing query 332 specifying a target and time from the client 306, the federation server 310 looks up the routing metric for the specified target and time in the temporal routing map 326, ascertains the identifier of the respective monitoring-server instance 308 based on the associated label, and then communicates the monitoring-server-instance identifier to the client in its response 334.

It is noted that, while the described approach to communicating routing information as time-series metrics has benefits, alternative approaches to building a routing map at the federation server 310 are conceivable. For example, the routing messages received by the federation server 310 may each include a timestamp paired with a single array of identifiers of the targets 304 that the sending monitoring-server instance scraped at the specified time (the identifier of the monitoring-server instance being implied or specified, e.g., in message header). The federation server 310 may then process the messages and reorganize the data to provide a map in which the target identifiers serve as the key (to facilitate the lookup in response to a query) and the monitoring-server-instance identifier is provided as a value. Further, if the messages are sent sufficiently close in time to the scraping of the targets, a timestamp indicating when the message is sent may be used as a proxy for the target-scraping time. It is also possible, in principle, that routing messages are sent from the monitoring-server instance only in response to a change in the target-to-monitoring-server mappings. Moreover, it is generally not important whether the monitoring-server instances are scraped for the routing information, i.e., send the messages containing the routing information in response to requests from the federation server 310, or whether they send the routing information at their own initiative.

Figure 4:
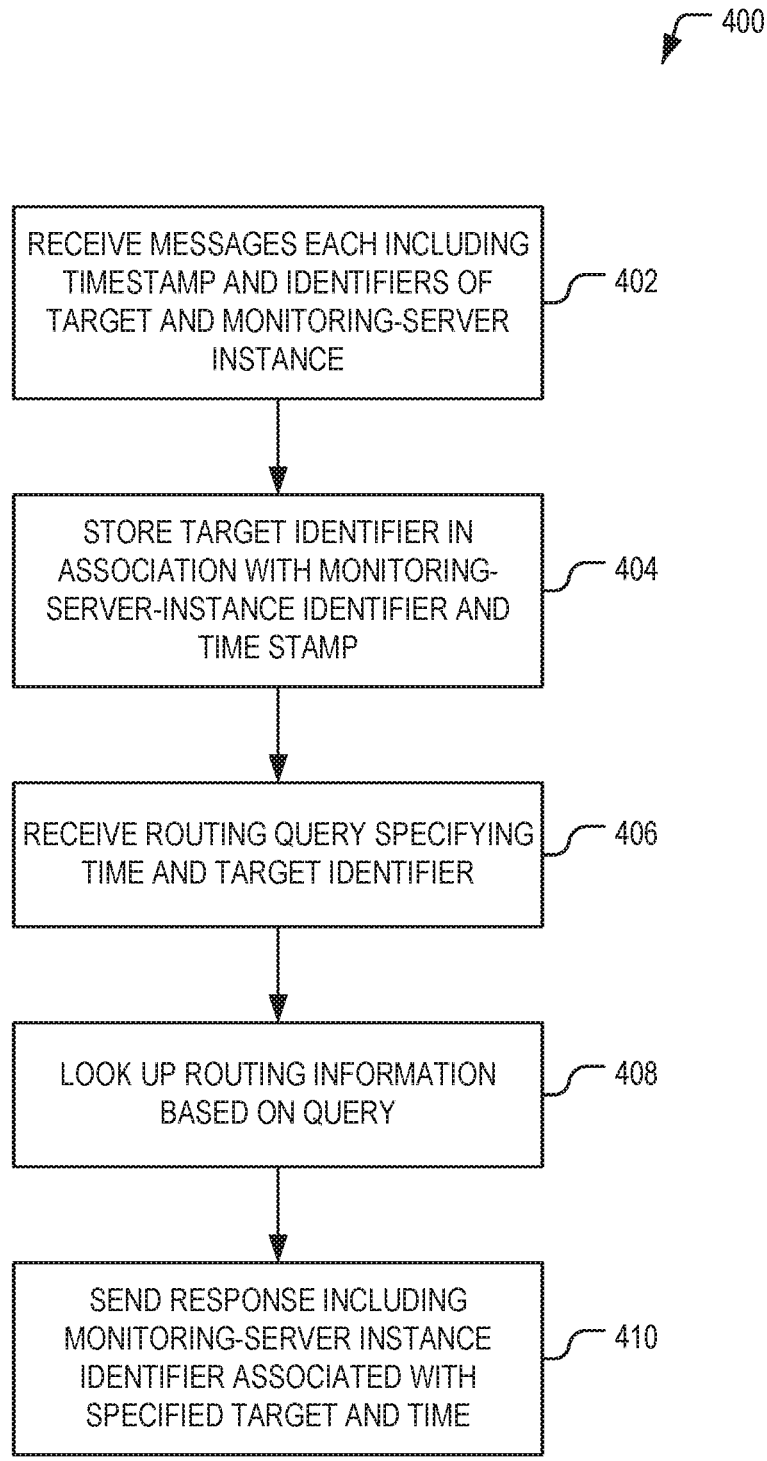
FIG. 4 is a flow chart illustrating operations performed in a method for query routing according to example embodiments.

FIG. 4 summarizes various operations performed by the federation server 310 in a method 400 for routing client queries according to example embodiments. The method 400 involves receiving messages each including a timestamp, a monitoring-server-instance identifier, and one or more target identifiers (operation 402), and, in response to each of the messages, storing the one or more target identifiers in association with the respective monitoring-server-instance identifier and the respective timestamp in the routing map 326 (operation 404). In some embodiments, the messages are received from the monitoring-server instances 308 as one or more time-series routing metrics 330 specifying the one or more targets from which the respective monitoring-server instance 308 is collecting metrics data. By repeating the receiving and storing operations 402, 404, the federation server 310 builds, over time, a temporal routing map 326 with routing data specifying time series of mappings between the targets and the respective monitoring-server instances. Since routing data is not needed for metrics data that are no longer retained on the monitoring-server instances 308 after passage of a set retention period, the federation server 310 may remove mappings that are older than a retention period from the routing map 326.

The method 400 further involves, at some point, receiving a routing query 332 specifying a time and a target identifier from a client 306 (operation 406). The federation server 310 looks up the requested routing information in the routing map 326 to determine a monitoring-server-instance identifier associated with the specified target identifier and with a timestamp corresponding to the specified time (operation 408). The federation server 310 then sends a response 334 including the monitoring-server instance identifier associated with the specified target identifier and time to the client 306 (operation 410).

Figure 5:
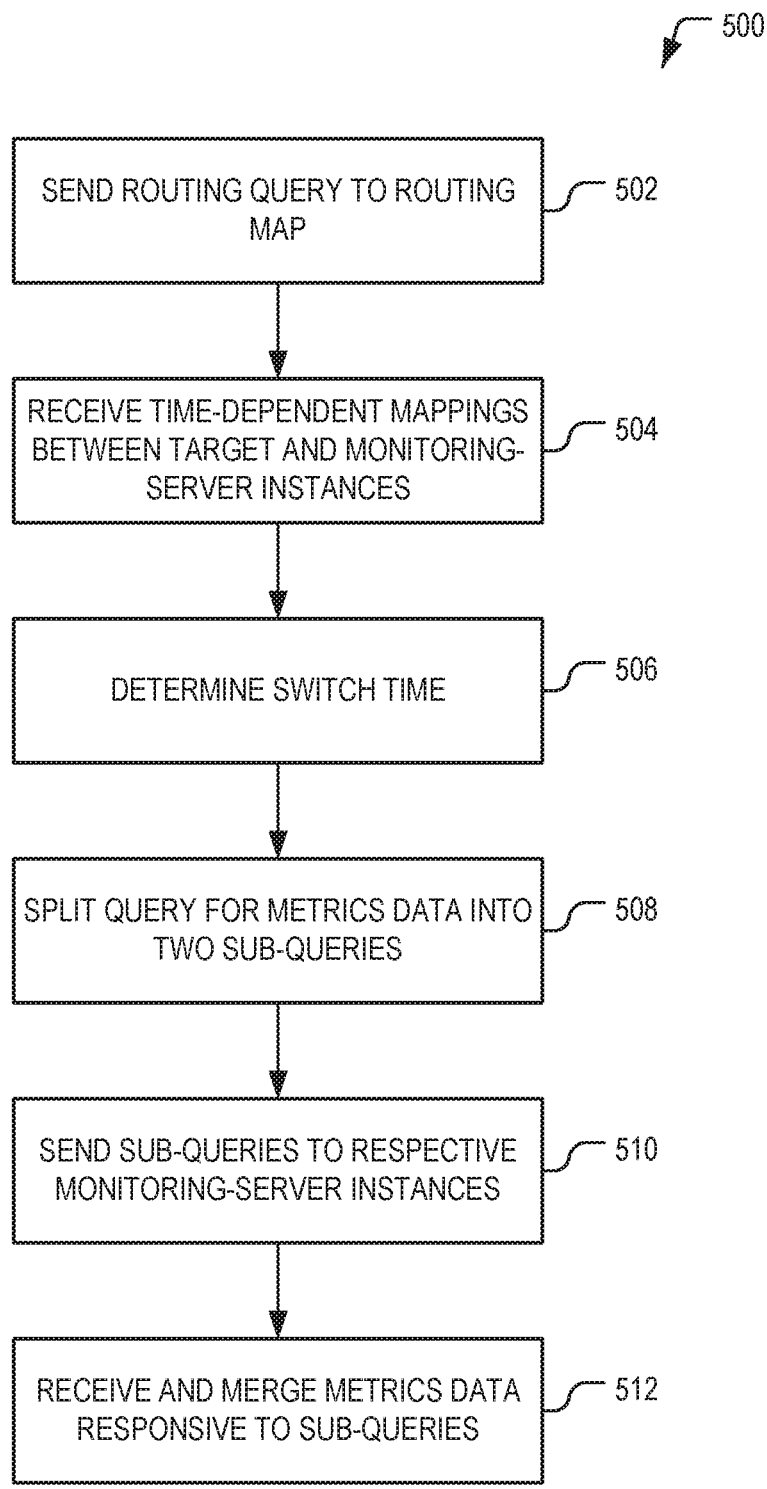
FIG. 5 is a flow chart illustrating operations performed in a method for metrics data querying across a time-range according to example embodiments.

With reference now to FIG. 5, in some instances, the client 306 wants to query the monitoring system 302 for metrics data associated with a time range rather than an individual point in time. Further, that time range my include a point in time at which metrics collection from the target 304 of interest to the client 306 switches from one monitoring-server instance 308 to another, for example, as a result of a change in the number of monitoring-server instances 308 operating within the monitoring system 302 at that time (herein also the "switch time"). FIG. 5 illustrates operations performed in a method 500, according to example embodiments, for metrics data querying under those circumstances. The method 500 may be executed by the client 306 itself. Alternatively, the monitoring ecosystem 300 may include an additional component (not shown in FIG. 3) that serves as an intermediary between the client 306 and the monitoring-server instances 308, channeling queries and responses between them. This intermediary may also interface with the federation server 310, or, alternatively, be implemented as part of the federation server 310.

The method 500 includes sending a routing query 332 specifying the target 304 and a time range spanning times preceding and following the switch time to the routing map 326 (operation 502), and receiving time-dependent mappings between the target 304 and monitoring-server instances 308 in response (operation 504). The query 332 may be sent directly from the client 306 to the federation server 310. Alternatively, an intermediary component may, in response to a client query for metrics data from a specified target 304 for a given time range, generate the routing query 332 and send it to the routing map 326. The routing response 334 may, in some embodiments, be a time series of mappings between the target 304 and monitoring-server instances 308. For timestamps preceding the switch time, the routing information will specify a first monitoring-server instance 308, and for timestamps following the switch time the routing information will specify a second monitoring-server instance 308. Alternatively to a complete time series of mappings, the response 334 to the client 306 may include two partial time ranges ending and beginning at the switch time respectively, and identify the first monitoring-server instance 308 in association with the partial time range ending at the switch time and the second monitoring-server instance 308 in association with the partial time range beginning at the switch time. Further variations are possible.

In any case, from the time-dependent mappings in the received routing information, the switch time can be determined (operation 506), e.g., by the client 306 or the intermediary component, as the case may be. The query for metrics data associated with the full time range of interest is then split, based on the switch time, into two sub-queries (operation 508). A first sub-query associated with the first partial time range is sent to the first monitoring-server instance 308, and the second sub-query associated with the second partial time range is sent to the second monitoring-server instance (operation 510). Upon receipt of the requested metrics data from the first and second monitoring-server instances, the data is merged (operation 512). Splitting the query, obtaining metrics for sub-queries, and merging the results (operations 508-512) can be performed by the client 306 or the intermediary. As will be readily appreciated by those of ordinary skill in the art, the method 500, while described for a time range including one switch time, can be straightforwardly extended to cases where the monitoring-server instance monitoring the target of interest switches multiple times during the time period of interest and the query would, accordingly, be split into three or more sub-queries.

Figure 6:
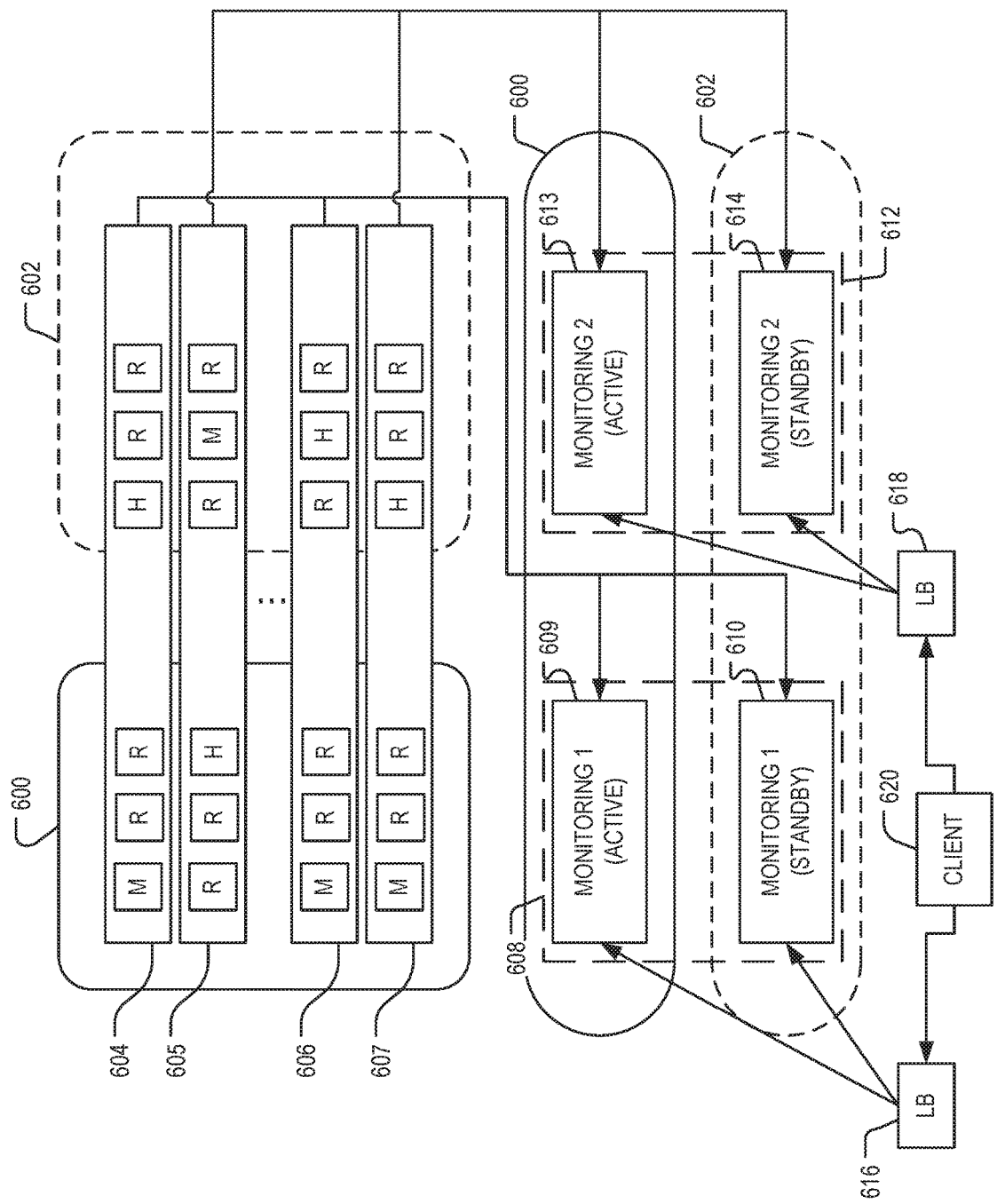
FIG. 6 is a block diagram illustrating redundant metrics collection by monitoring-server instances across multiple data centers according to example embodiments.

Referring to FIG. 6, in various embodiments, the metrics data from a given monitoring target is collected by multiple monitoring-server instances for redundancy, and these monitoring-server instances may be located within different data centers to maximize data security and availability. For example, as depicted in FIG. 6, each target may be scraped by a pair of monitoring-server instances executing within two respective data centers 600, 602. The targets may likewise be distributed across the two data centers 600, 602, as may certain types of individual targets. FIG. 6 shows, as an illustrative example, multiple database shards 604, 605, 606, 607 that each includes a replica set with some replica stored on data center 600, and the other stored on data center 602; the individual replica are marked "M" (for the master), "R" (for secondary replica), and "H" (for the hidden replica), respectively. According to the depicted mapping scheme, database shards 604 and 606 are scraped by a first pair 608 of monitoring-server instances 609, 610, and database shards 605 and 607 are scraped by a second pair 612 of monitoring-server instances 613, 614. Within each of the pairs 608, 612, one of the monitoring-server instances (e.g., as depicted, monitoring-server instances 609, 613) serves as the active one for purposes of servicing client queries and sending level-0 metrics to the federation server while the other one (e.g., as depicted, monitoring-server instances 610, 614) serves as a standby. Both monitoring-server instances within a pair collect the same metrics from the same set of targets and retain the metrics data for the same retention period. (Note that the federation server may itself be implemented as a redundant pair.)

In some embodiments, each pair 608, 612 of monitoring-server instances has an associated cross-data-center virtual IP address, e.g., provided through a global traffic manager. Using virtual IP addresses, queries from a client 620 (which may be, e.g., visualization tool 106) or scraping requests from the federation server can be addressed to the abstracted pair rather than an individual federation-server instance. The global traffic manager may include one or more load balancers for routing the queries to one of the monitoring-server instances of the respective pair that stores the metrics data of interest, depending on availability. In some embodiment, as shown, each pair 608, 612 of monitoring-server instances has its own respective associated load balancer 616, 618 such that, for example, a query from the client 620 for metrics data pertaining to database shard 604 would be sent to load balancer 616, which would ordinarily direct the query to monitoring-server instance 609 and, if that instance is unavailable (e.g., due to an interrupted network connection to data center 600), to monitoring-server instance 610. In other embodiments, a single load balancer directs client queries based on the target to the respective pair of monitoring-server instances that has the data as well as to the active monitoring-server instance within the pair. As will be appreciated by those of ordinary skill in the art, redundancy is not confined to collecting metrics from each target by two monitoring-server instances; rather, data availability may be further increased by increasing the level of redundancy and scraping any given subset of targets by more than two monitoring-server instances.

Figure 7:
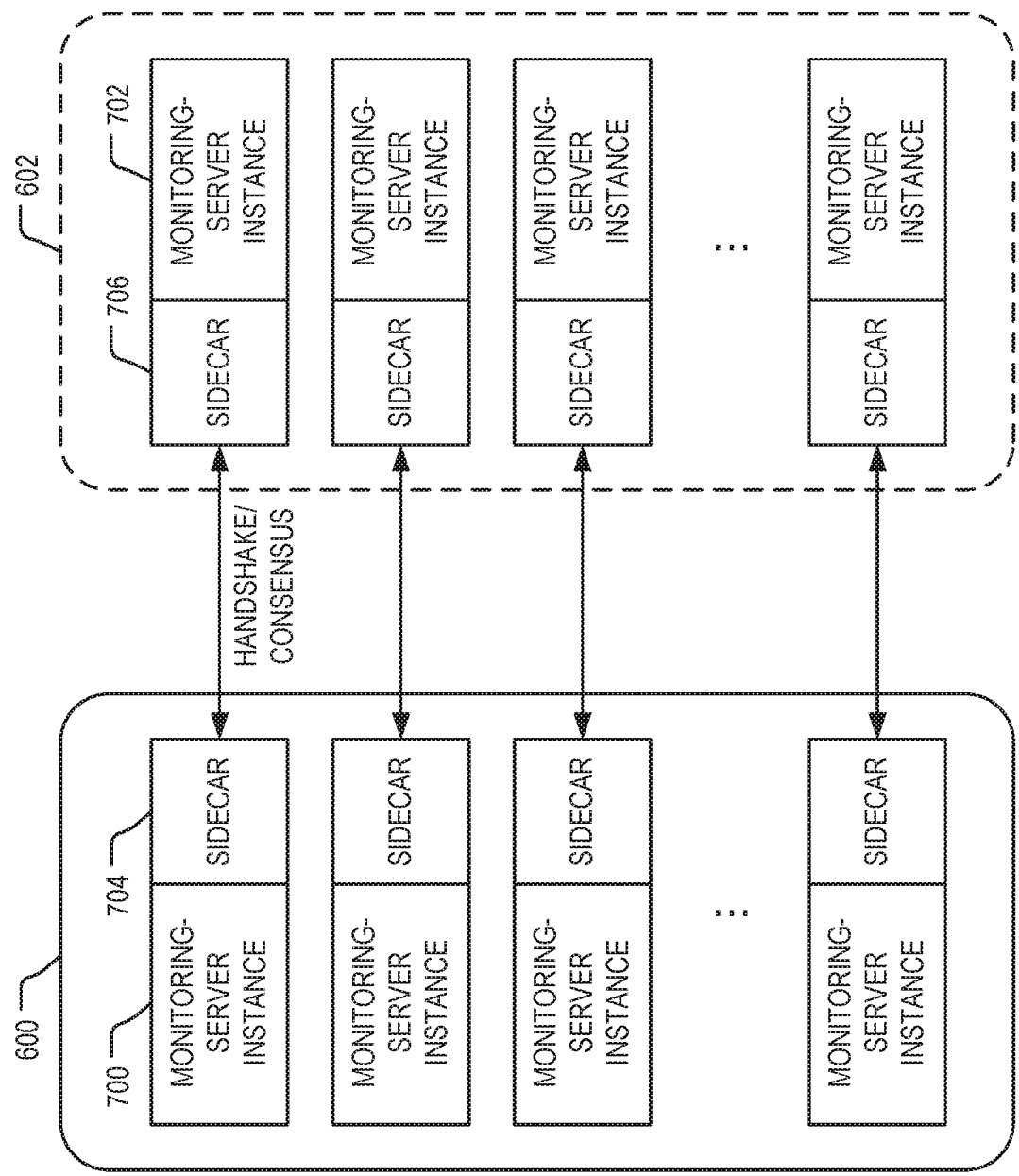
FIG. 7 is a block diagram illustrating health-based load balancing between redundant monitoring-server instances according to example embodiments.

FIG. 7 illustrates in more detail load balancing between redundant monitoring-server instances according to example embodiments. Rather than using round-robin style load balancing, these embodiments may implement a sticky failover policy in which traffic is routed to the monitoring-server instance (among a pair of redundant monitoring-server instances) that provides the best data quality, e.g., in the sense that it has the fewest and/or oldest gaps in collected metrics data. For this purpose, as shown, each monitoring-server instance (e.g., 700 or 702) may be provided with an instance of a health-monitor sidecar container (e.g., 704 or 706), such as an extended content verification (ECV) sidecar, that measures the health of the data stored on the monitoring-server instance. The sidecar instances of a redundant pair of monitoring-server instances (e.g., sidecar instances 704, 706 associated with monitoring-server instances 700, 702 in data centers 600, 602 interact and handshake with each other to provide a consensus projection concerning which one of them has the better data and should, therefore, be the active or leading monitoring-server instance serving data to the client and/or federation server.

Figure 8:
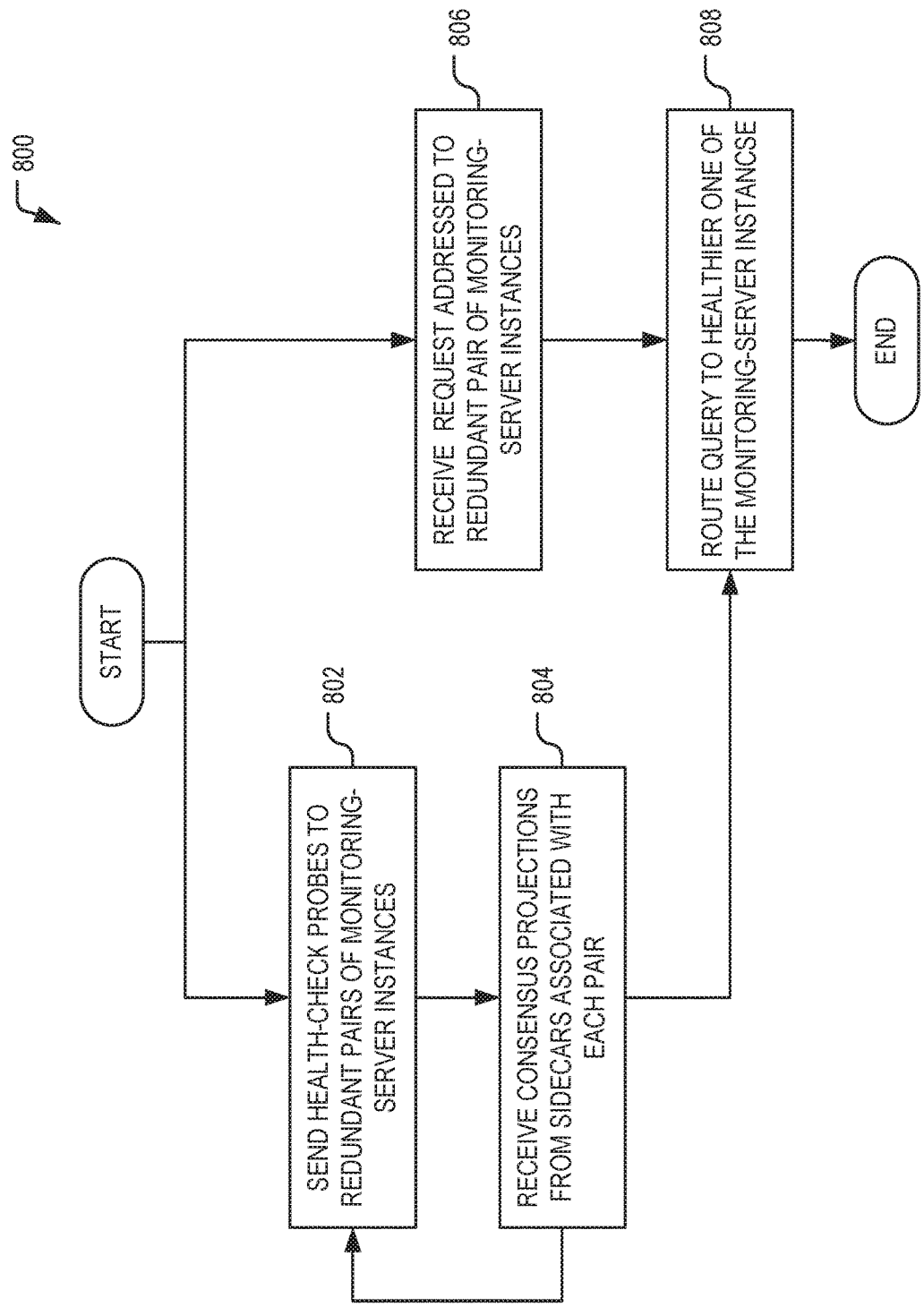
FIG. 8 is a flow chart illustrating operations of components within a monitoring system in performing a method for health-based load balancing between redundant monitoring-server instances according to example embodiments.

FIG. 8 is a flow chart summarizing operations performed in a method 800 for health-based load balancing between redundant monitoring-server instances according to example embodiments. The method 800 involves sending, e.g., by the load balancer(s) of the global traffic monitor, health-check probes to all redundant pairs of monitoring-server instances (including the pair of federation server instances) at regular intervals (e.g., every five seconds) (operation 802) and receiving the projections (operation 804). The paired monitoring-server instances continuously perform handshakes and consensus projections between the sidecar instances associated with each pair. The consensus projection result is made ready for the health-check probing. Note that health checks can be performed at various levels of sophistication. For example, a basic health check may simply determine the current reachability of each monitoring-server instance, whereas an enhanced health check may include a consensus protocol performed at each sidecar that involves data quality evaluation. The data quality evaluation can rely on querying the time-series data stored on each monitoring-server instance to determine, e.g., any time gaps in the data (e.g., time periods that have data missing) and how long ago they occurred. Smaller time gaps lead to higher data quality scores compared to larger time gaps. Time gaps happened a longer time ago lead to higher data quality scores compared to the ones that happened more recently. The enhanced health check can then choose the monitoring-server instance that has the higher data quality score.

The method 800 further involves, at some point, receiving, at a load balancer, a client query (or request from the federation server acting as client with respect to a monitoring-server instance) addressed to one of the pairs of monitoring-server instances using the respective virtual IP address belonging to the load balancer (operation 806). Based on the most recent health-check data for that pair, the query is then routed to the healthier one of the two monitoring-server instances (operation 808). Alternatively to continuously checking the health of all monitoring-server instances, it is also possible to trigger health-check probes and the resulting consensus projections only upon receipt of a query directed to a particular pair of monitoring-server instances.

Figure 9:
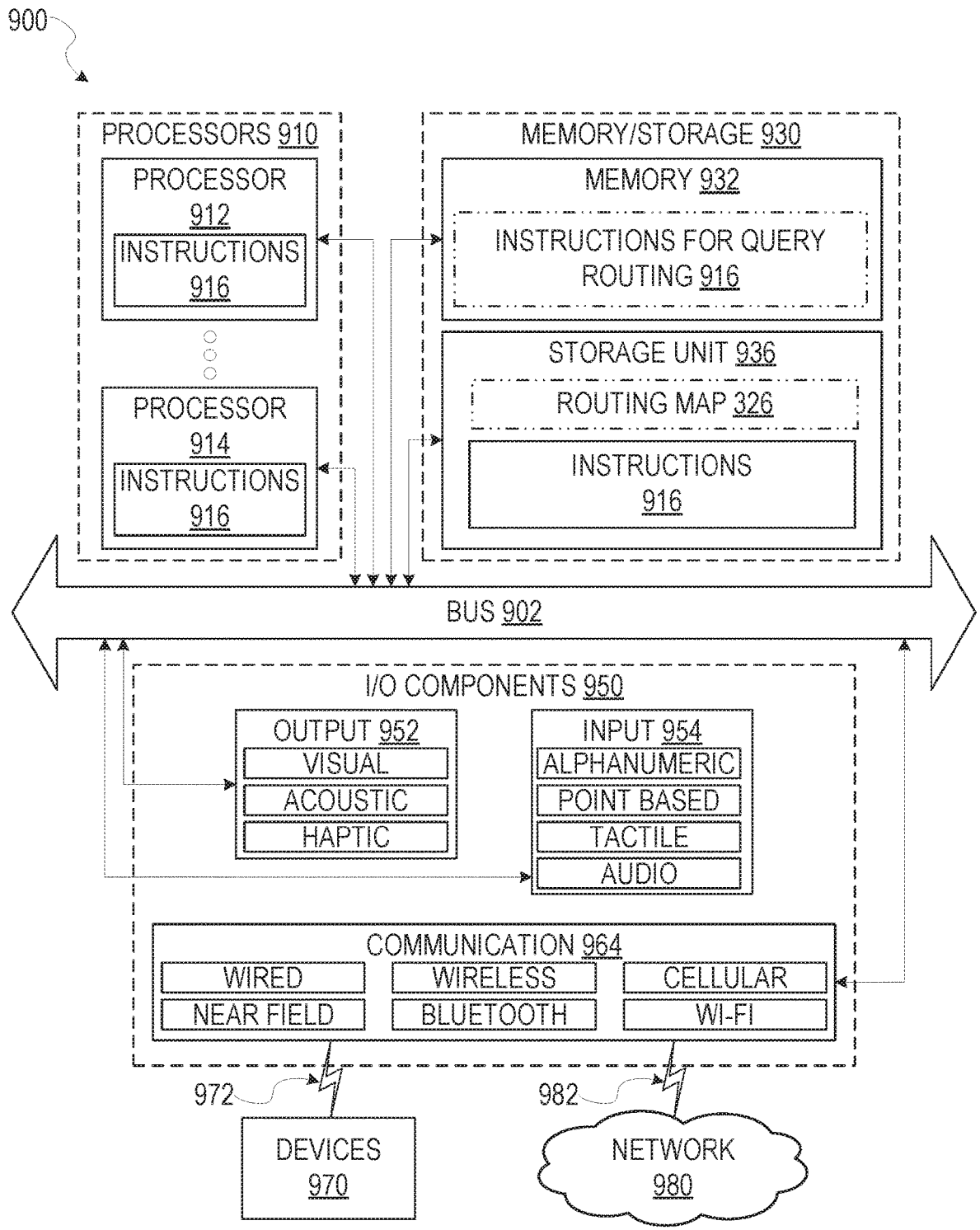
FIG. 9 is a diagrammatic representation of a machine in the example form of a computer system within which a set of instructions for causing the machine to perform any one or more of the methodologies discussed herein may be executed.

FIG. 9 shows a diagrammatic representation of a machine 900 in the example form of a computer system within which instructions 916 (e.g., software, a program, an application, an applet, an app, or other executable code) for causing the machine 900 to perform any one or more of the methodologies discussed herein may be executed. The machine 900 may, for example, implement any of the monitored system 102 (or individual hosts 204, 205, 206, 207 in a distributed system), the monitoring system 104 (or monitoring-server instances 220, 221, 222, 223, 224, 308 or federation server 310), or the visualization tool 106 or other client 306. The instructions 916 may cause the machine 900 to execute any of the methods illustrated in FIGS. 4, 5, and 8. The instructions 916 transform the general, non-programmed machine into a particular machine programmed to carry out the described and illustrated functions in the manner described. By way of example only, dash-dotted boxes indicate the machine 900 as implementing the federation server 310.

In various embodiments, the machine 900 operates within a network through which it is connected to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, or other computer capable for use as any of the actors within the monitoring system described herein. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 912 and processor 914 that may execute instructions 916. The term "processor" is intended to include multi-core processor that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core process), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of processors 910 are examples of machine-readable media. When configured as federation server 310, the memory 932 and/or storage unit 936 may, in addition to instructions implementing method 400, also store the routing map 326.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se. The terms "client" and "server" each refer to one or more computers—for example, a "server" may be a cluster of server machines.

The I/O components 950 may include a wide variety of components to receive input, provide output, produce output, transmit information, exchange information, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

The following numbered examples are illustrative embodiments.

1. A server comprising: one or more processors; and memory storing a temporal routing map and instructions for execution by one or more processors. The temporal routing map comprises routing data specifying time series of mappings between a plurality of targets and a plurality of monitoring-server instances that collect metrics data from the targets, each target having an associated target identifier and each monitoring-server instance having an associated monitoring-server-instance identifier. The instructions, when executed, cause the one or more processors to perform operations comprising: receiving messages each including a timestamp, a monitoring-server-instance identifier, and one or more target identifiers; in response to each of the messages, storing the one or more target identifiers in association with the respective monitoring-server-instance identifier and the respective timestamp in the routing map; receiving, from a client, a routing query specifying a time and a target identifier; determining a monitoring-server-instance identifier associated with the specified target identifier and with a timestamp corresponding to the specified time using the routing map; and sending a response to the client, the response including the monitoring-server instance identifier associated with the specified target identifier and with the timestamp corresponding to the specified time.

2. The server of example 1, wherein the messages are received from the monitoring-server instances as time-series routing metrics specifying the one or more targets from which the respective monitoring-server instance is collecting metrics data.

3. The server of example 1 or example 2, wherein the mapping of a first target changes at a switch time from a first monitoring-server instance to a second-monitoring server instance, wherein the messages include one or more first messages including timestamps corresponding to times preceding the switch times, a first target identifier associated with the first target, and a first monitoring-server-instance identifier associated with the first monitoring-server instance, and wherein the messages include one or more second messages including timestamps corresponding to times following the switch times, the first target identifier, and a second monitoring-server-instance identifier associated with the second monitoring-server instance.

4. The server of example 3, wherein the monitoring-server instances change in number at the switch time.

5. The server of example 3 or example 4, wherein the routing query specifies a target identifier of the first target and a time range spanning times preceding and following the switch time, and wherein the response includes the first monitoring-server identifier in association with a first partial time range ending at the switch time and the second monitoring-server instance identifier with a second partial time range beginning at the switch time.

6. The server of example 5, wherein the operations further comprise: splitting a client query for metrics data associated with the first target and the time range into a first sub-query associated with the first partial time range and a second sub-query associated with the second partial time range; sending the first sub-query to the first monitoring-server instance and receiving, in response, first metrics data from the first monitoring-server instance; sending the second sub-query to the second monitoring-server instance and receiving, in response, second metrics data from the second monitoring-server instance; and merging the first and second metrics data.

7. The server of any one of examples 3-6, wherein, prior to the switch time, the first monitoring-server instance collects metrics data from the first target and from one or more additional targets, and aggregates the collected metrics data into first lower-level aggregated metrics data; and the operations further comprise receiving the first lower-level aggregated metrics data from the first monitoring-server instance and receiving additional lower-level aggregated metrics data from one or more additional monitoring-server instances, and aggregating the first and additional lower-level aggregated metrics data into higher-level aggregated metrics data.

8. The server of example 7, wherein the targets comprise database shards, and wherein the first monitoring-server instance and the additional monitoring server instances collect metrics data from database shards associated with a common keyspace.

9. The server of any one of examples 1-8, wherein the metrics data includes at least one of time-series operating-system metrics or time-series virtual runtime metrics.

10. The server of any one of examples 1-9, wherein the operations further comprise: removing mappings that are older than a retention period from the routing map.

11. The server of any one of examples 1-10, wherein the monitoring server-instances store data in a multi-dimensional data model.

12. A method comprising: storing, in computer memory of a server, a temporal routing map comprising routing data specifying time series of mappings between a plurality of targets and a plurality of monitoring-server instances that collect metrics data from the targets, each target having an associated target identifier and each monitoring-server instance having an associated monitoring-server-instance identifier; receiving messages each including a timestamp, a monitoring-server-instance identifier, and one or more target identifiers; in response to each of the messages, storing the one or more target identifiers in association with the respective monitoring-server-instance identifier and the respective timestamp in the routing map; receiving a routing query from a client, the routing query specifying a time and a target identifier; determining a monitoring-server-instance identifier associated with the specified target identifier and with a timestamp corresponding to the specified time using the routing map; and sending a response to the client, the response including the monitoring-server instance identifier associated with the specified target identifier and with the timestamp corresponding to the specified time.

13. The method of example 12, wherein the messages are received from the monitoring-server instances as time-series routing metrics specifying the one or more targets from which the respective monitoring-server instance is collecting metrics data.

14. The method of example 13, wherein the mapping of a first target changes at a switch time from a first monitoring-server instance to a second-monitoring server instance, wherein the messages include one or more first messages including timestamps corresponding to times preceding the switch times, a first target identifier associated with the first target, and a first monitoring-server-instance identifier associated with the first monitoring-server instance, and wherein the messages include one or more second messages including timestamps corresponding to times following the switch times, the first target identifier, and a second monitoring-server-instance identifier associated with the second monitoring-server instance.

15. The method of example 14, wherein the monitoring-server instances change in number at the switch time.

16. The method of example 14 or example 15, wherein the routing query specifies a target identifier of the first target and a time range spanning times preceding and following the switch time, and wherein the response includes the first monitoring-server identifier in association with a first partial time range ending at the switch time and the second monitoring-server instance identifier with a second partial time range beginning at the switch time.

17. The method of example 16, further comprising: splitting a client query for metrics data associated with the first target and the time range into a first sub-query associated with the first partial time range and a second sub-query associated with the second partial time range; sending the first sub-query to the first monitoring-server instance and receiving, in response, first metrics data from the first monitoring-server instance; sending the second sub-query to the second monitoring-server instance and receiving, in response, send metrics data from the second monitoring-server instance; and merging the first and second metrics data.

18. The method of any one of examples 14-17, wherein, prior to the switch time, the first monitoring-server instance collects metrics data from the first target and from one or more additional targets and aggregates the collected metrics data into first lower-level aggregated metrics data, the method further comprising receiving the first lower-level aggregated metrics data from the first monitoring-server instance and receiving additional lower-level aggregated metrics data from one or more additional monitoring-server instances, and aggregating the first and additional lower-level aggregated metrics data into higher-level aggregated metrics data.

19. The method of example 18, wherein the targets comprise database shards, and wherein the first monitoring-server instance and the additional monitoring server instances collect metrics data from database shards associated with a common keyspace.

20. One or more machine-readable media storing instructions for execution by one or more processors, the instructions, when executed, causing the one or more processors to perform operations comprising: creating a temporal routing map comprising routing data specifying time series of mappings between a plurality of targets and a plurality of monitoring-server instances that collect metrics data from the targets by receiving messages each including a timestamp, a monitoring-server-instance identifier associated with one of the monitoring-server instances, and one or more target identifiers associated with one or more of the targets, and, in response to each of the messages, storing the one or more target identifiers in association with the respective monitoring-server-instance identifier and the respective timestamp in the routing map; receiving a routing query from a client, the routing query specifying a time and a target identifier; determining a monitoring-server-instance identifier associated with the specified target identifier and with a timestamp corresponding to the specified time using the routing map; and sending a response to the client, the response including the monitoring-server instance identifier associated with the specified target identifier and with the timestamp corresponding to the specified time.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A server comprising:
one or more processors; and
memory storing:
   a temporal routing map comprising routing data specifying time series of mappings between a plurality of targets and a plurality of monitoring-server instances that collect metrics data from the targets, each target corresponding to a component or a component-shard of a monitored system; and
   instructions for execution by the one or more processors, the instructions, when executed, causing the one or more processors to perform operations comprising:
     receiving, from a client, a routing query specifying a time and a target identifier;
     determining a monitoring-server-instance identifier associated with a specified target identifier and with a timestamp corresponding to a specified time using the temporal routing map; and
     sending a response to the client, the response including the monitoring-server-instance identifier associated with the specified target identifier and with the timestamp corresponding to the specified time.

2. The server of claim 1, wherein the operations further comprise receiving messages from the monitoring-server instances as time-series routing metrics specifying one or more of the targets from which a respective monitoring-server instance is collecting the metrics data.

3. The server of claim 1, wherein:
a mapping of a target changes at a switch time from a first monitoring-server instance to a second-monitoring server instance,
messages received from the monitoring-server instances include one or more first messages having timestamps corresponding to times preceding the switch time, a target identifier associated with the target, and a first monitoring-server-instance identifier associated with the first monitoring-server instance, and
the messages include one or more second messages having timestamps corresponding to times following the switch time, the target identifier associated with the target, and a second monitoring-server-instance identifier associated with the second monitoring-server instance.

4. The server of claim 3, wherein the monitoring-server instances change in number at the switch time.

5. The server of claim 3, wherein the routing query specifies the target identifier associated with the target and a time range spanning times preceding and following the switch time, and wherein the response includes the first monitoring-server-instance identifier in association with a first partial time range ending at the switch time and the second monitoring-server-instance identifier in association with a second partial time range beginning at the switch time.

6. The server of claim 5, wherein the operations further comprise:
splitting the routing query into a first sub-query associated with the first partial time range and a second sub-query associated with the second partial time range;
sending the first sub-query to the first monitoring-server instance and receiving, in response, first metrics data from the first monitoring-server instance;
sending the second sub-query to the second monitoring-server instance and receiving, in response, second metrics data from the second monitoring-server instance; and
merging the first and second metrics data.

7. The server of claim 3, wherein, prior to the switch time:
the first monitoring-server instance collects the metrics data from the target and from one or more additional targets, and aggregates collected metrics data into first lower-level aggregated metrics data; and
the operations further comprise receiving the first lower-level aggregated metrics data from the first monitoring-server instance and receiving additional lower-level aggregated metrics data from one or more additional monitoring-server instances, and aggregating the first and additional lower-level aggregated metrics data into higher-level aggregated metrics data.

8. The server of claim 1, wherein the routing query is received responsive to user input received via a user interface of a visualization tool to request information about the monitored system.

9. The server of claim 1, wherein the metrics data includes at least one of time-series operating-system metrics or time-series virtual runtime metrics.

10. The server of claim 1, wherein the operations further comprise removing the mappings that are older than a retention period from the temporal routing map.

11. The server of claim 1, wherein each of the monitoring-server instances is assigned to collect the metrics data from a subset of the targets.

12. A method comprising:
storing a temporal routing map comprising routing data specifying time series of mappings between a plurality of targets and a plurality of monitoring-server instances that collect metrics data from the targets, each target corresponding to a component or a component-shard of a monitored system;
receiving a routing query from a client, the routing query specifying a time and a target identifier;
determining a monitoring-server-instance identifier associated with a specified target identifier and with a timestamp corresponding to a specified time using the temporal routing map; and
sending a response to the client, the response including the monitoring-server-instance identifier associated with the specified target identifier and with the timestamp corresponding to the specified time.

13. The method of claim 12, further comprising receiving messages from the monitoring-server instances as time-series routing metrics specifying one or more of the targets from which a respective monitoring-server instance is collecting the metrics data.

14. The method of claim 13, wherein:
a mapping of a target changes at a switch time from a first monitoring-server instance to a second-monitoring server instance,
messages received from the monitoring-server instances include one or more first messages having timestamps corresponding to times preceding the switch time, a target identifier associated with the target, and a first monitoring-server-instance identifier associated with the first monitoring-server instance, and
the messages include one or more second messages having timestamps corresponding to times following the switch time, the target identifier associated with the target, and a second monitoring-server-instance identifier associated with the second monitoring-server instance.

15. The method of claim 14, wherein the monitoring-server instances change in number at the switch time.

16. The method of claim 14, wherein the routing query specifies the target identifier associated with the target and a time range spanning times preceding and following the switch time, and wherein the response includes the first monitoring-server-instance identifier in association with a first partial time range ending at the switch time and the second monitoring-server-instance identifier in association with a second partial time range beginning at the switch time.

17. The method of claim 16, further comprising:
splitting the routing query into a first sub-query associated with the first partial time range and a second sub-query associated with the second partial time range;
sending the first sub-query to the first monitoring-server instance and receiving, in response, first metrics data from the first monitoring-server instance;
sending the second sub-query to the second monitoring-server instance and receiving, in response, second metrics data from the second monitoring-server instance; and
merging the first and second metrics data.

18. The method of claim 14, wherein, prior to the switch time, the first monitoring-server instance collects the metrics data from the target and from one or more additional targets and aggregates collected metrics data into first lower-level aggregated metrics data, the method further comprising receiving the first lower-level aggregated metrics data from the first monitoring-server instance and receiving additional lower-level aggregated metrics data from one or more additional monitoring-server instances, and aggregating the first and additional lower-level aggregated metrics data into higher-level aggregated metrics data.

19. The method of claim 18, wherein the targets comprise database shards, and wherein the first monitoring-server instance and the additional monitoring server instances collect metrics data from the database shards that are associated with a common keyspace.

20. One or more machine-readable media storing instructions for execution by one or more processors, the instructions, when executed, causing the one or more processors to perform operations comprising:

creating a temporal routing map comprising routing data specifying time series of mappings between a plurality of targets and a plurality of monitoring-server instances that collect metrics data from the targets, each target corresponding to a component or a component-shard of a monitored system;

receiving a routing query from a client, the routing query specifying a time and a target identifier;

determining a monitoring-server-instance identifier associated with a specified target identifier and with a timestamp corresponding to a specified time using the temporal routing map; and sending a response to the client, the response including the monitoring-server-instance identifier associated with the specified target identifier and with the timestamp corresponding to the specified time.

* * * * *